G. BAUER AND F. KRAMER.
TESTING APPARATUS FOR INDICATING LEAKS.
APPLICATION FILED MAR. 31, 1922.
1,423,902.
Patented July 25, 1922.
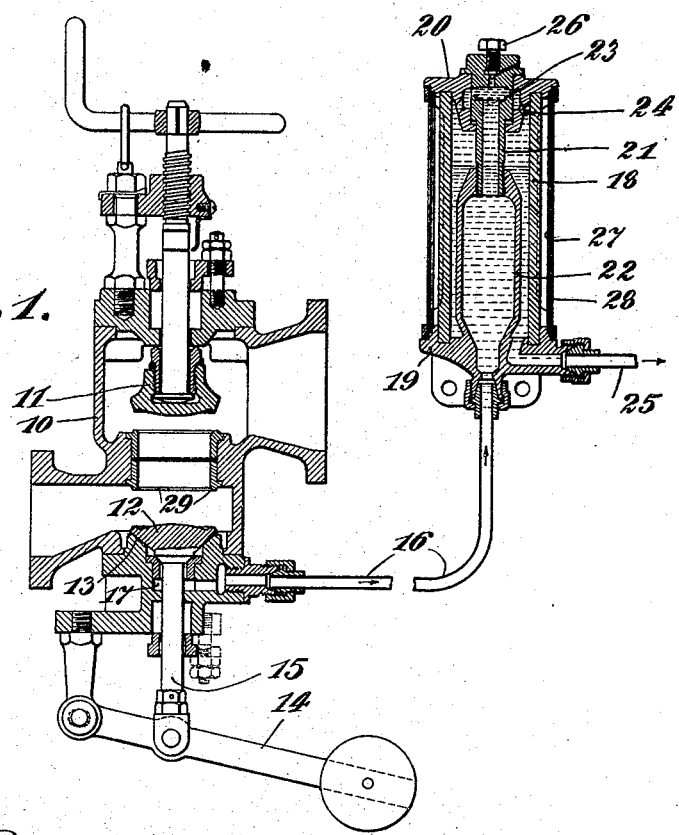
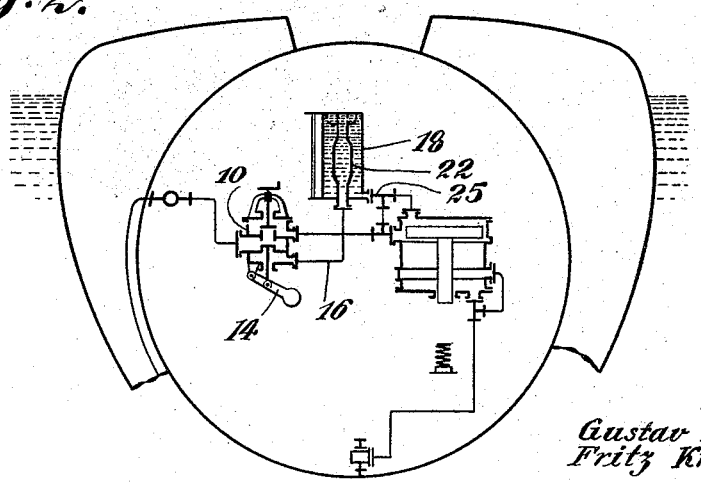
Inventors
Gustav Bauer
Fritz Kramer
their Attorneys

UNITED STATES PATENT OFFICE.

GUSTAV BAUER, OF HAMBURG, AND FRITZ KRAMER, OF BLANKENESE-DOCKENHUDEN, NEAR HAMBURG, GERMANY.

TESTING APPARATUS FOR INDICATING LEAKS.

1,423,902.  Specification of Letters Patent.  Patented July 25, 1922.

Application filed March 31, 1922. Serial No. 548,482.

*To all whom it may concern:*

Be it known that we, GUSTAV BAUER, a citizen of the Republic of Germany, and a resident of Hamburg, Germany, and FRITZ KRAMER, a citizen of the Republic of Germany, and a resident of Blankenese-Dockenhuden, near Hamburg, Germany, have invented certain new and useful Improvements in Testing Apparatus for Indicating Leaks (for which we made application in Germany November 19, 1917), and of which the following is a specification.

This invention is a test valve and leak indicator for use in connection with submarines having means for establishing and maintaining a sub-pressure in the fuel oil tank or tanks, that is, a pressure below that of the sea water, so that in case there is any leakage it will be of sea water inwardly into the oil tank, rather than of oil outwardly.

By means of our invention, a test valve may be operated whereby a connection between the fuel oil tank and the device for establishing and maintaining the sub-pressure may be closed, and a connection to the leak indicator can be opened or brought into operation, whereby exterior water, entering through a leak as a result of the sub-pressure in the interior of the tank as compared with the exterior water pressure, can be indicated and observed in its passage through some such medium as oil.

In the accompanying drawings:

Fig. 1 is a vertical section of a device embodying our invention, and

Fig. 2 is a diagrammatic view showing the apparatus in connection with other parts with which it cooperates.

Each fuel oil tank has a conduit or connection forming a communication between it and the pressure regulating apparatus or other device which is operated to establish and maintain the desired pressure in the tank below that of the outside sea water. In this conduit there is provided a valve casing 10 which may, if desired, be provided with a manually operable shut-off valve 11. In a suitable valve casing, and preferably in the casing 10 on the tank side of the valve 11 we provide a test valve 12, normally held against a valve seat 13 so as not to interfere with the free flow of fluid through the conduit and valve casing. Any suitable means may be employed for holding this valve to its seat, that illustrated being a weighted lever 14 connected to the valve stem 15. A small pipe 16 is connected to the valve casing below the valve 12, and communicates with a chamber 17 encircling the valve stem. The pipe 16 leads to the leak indicator which is illustrated as a glass cylinder 18 closed at its ends by heads 19 and 20. The two heads are drawn toward each other so as to engage the ends of the cylinder and form liquid tight seals by means of a tubular bolt member 21 extending through the upper head 20, and having threaded engagement with a tubular projection 22 on the lower cylinder head. The pipe 16 connects to the lower end of the tubular projection 22, and the interior of this projection communicates through the tubular bolt member 21 and passages 23 and 24 with the upper end of the interior of the cylinder. The lower cylinder head outside of the tubular projection 22 may be connected by a conduit 25 with an intake of the device for establishing and maintaining the sub-pressure. The leak indicator has a suitable valve or plug 26 at its upper end whereby it may be filled or vented. Outside of the glass cylinder the cylinder heads may support stationary and movable blinds or screens 27 and 28 for protecting the glass, and also for deflecting the light while making observations. The lower part of the cylinder is normally filled with water while the upper part is filled with oil.

During the normal operation there is no flow through the pipes 16 and 25, as the valve 12 is in such position as to close the inlet end of the pipe 16. When it is desired to test the fuel oil tank to which the conduit including the valve casing 10 is connected, the valve 12 is raised to open the inlet end of the pipe 16. By raising the valve to its limiting extent, its upper end engages a valve seat 29 so as to effectively shut off direct flow of fluid through the valve casing 10, and make the leak indicator a part of the only connection between the tank and the device for maintaining the sub-pressure.

If the submarine is moving under water while submerged to a uniform depth, then the sub-pressure in all of the tanks should be permanently maintained by the device for establishing and maintaining the sub-pressure, and without placing special pumps in operation. If the sub-pressure varies, this is an indication that water is entering the tank from the exterior. For ascertaining the location of the leak the individual test valves which are in the separate conduits connecting the several tanks and the sub-pressure maintaining device are closed in succession. Thus, each tank is separately tested by establishing communication between it and the sub-pressure maintaining device, through its by-pass which includes its leak indicator. If the tank being tested has a leak, the water rising in the inner cylinder 22 will force the oil down in the outer cylinder until the water overflows at the passages 23 and 24. This water will sink to the bottom through the layer of oil in the outer cylinder, and may be readily observed through the glass wall 18 as it passes through the oil. If there is no leak, the level of the oil in the tubular member 21 and the outer cylinder will be the same, and will remain constant with no flow of water through the oil. The extent of the leak may be determined by noting whether a drop or a current of water passes downwardly through the oil. If the tank be water-tight, no water current to the sub-pressure maintaining device will take place.

Our improved device may be used with various different forms of apparatus for establishing and maintaining the desired pressure in the tank. In Fig. 2 we have illustrated it in connection with an apparatus substantially the same as that disclosed and claimed in our Patent 1,414,615 issued May 2nd, 1922 to which reference is to be had for a full description of said apparatus.

Having thus described our invention, what we claim as new and desire to secure by Letters Patent is:—

1. A leak indicating apparatus for submarine fuel oil tanks maintained at sub-pressure, including a conduit for connecting the tank to the apparatus for establishing and maintaining the sub-pressure, a valve for closing said conduit, a normally closed by-pass around said valve, and means in said by-pass for indicating the passage of water therethrough.

2. A leak indicating apparatus for submarine fuel oil tanks maintained at sub-pressure, including a conduit for connecting the tank to the apparatus for establishing and maintaining the sub-pressure, a valve for closing said conduit, a normally closed by-pass around said valve, and means in said by-pass whereby exterior water entering the tank through a leak as a result of the sub-pressure in the tank with respect to the exterior water pressure, may be indicated in its flow through said by-pass.

3. A leak indicating apparatus for submarine fuel oil tanks maintained at sub-pressure, including a conduit for connecting the tank to the apparatus for establishing and maintaining the sub-pressure, a valve for closing said conduit, a normally closed by-pass around said valve, and a chamber in said by-pass adapted to contain oil and water, the inlet to said chamber being at the upper end, and the outlet from the lower end, whereby passage of water downwardly through the oil in said chamber may be noted.

4. A leak indicating apparatus for submarine fuel oil tanks maintained at sub-pressure, including a conduit for connecting the tank to the apparatus for establishing and maintaining the sub-pressure, a valve for closing said conduit, and a by-pass around said valve, including a chamber having a glass wall and adapted to hold water and oil, the inlet to said chamber extending upwardly therethrough and opening into the upper end of the chamber, and adapted to also contain water and oil, and the outlet from said chamber being at the lower end thereof.

5. A leak indicating apparatus for submarine fuel oil tanks maintained at sub-pressure, including a conduit for connecting the tank to the apparatus for establishing and maintaining the sub-pressure, a by-pass including a leak indicator and a valve adapted to close either said conduit or said by-pass, and normally closing the latter.

Signed at Hamburg in the county of Hamburg and State of Hamburg, this 7th day of March, 1922.

Dr. GUSTAV BAUER.
FRITZ KRAMER.